United States Patent [19]

Appenzeller

[11] 4,192,050
[45] Mar. 11, 1980

[54] METHOD OF MAKING A HELICALLY GROOVED ROLLER

[75] Inventor: Valentin Appenzeller, Kempen, Fed. Rep. of Germany

[73] Assignee: Eduard Kusters, Krefeld, Fed. Rep. of Germany

[21] Appl. No.: 874,559

[22] Filed: Feb. 2, 1978

[30] Foreign Application Priority Data

Feb. 2, 1977 [DE] Fed. Rep. of Germany ....... 2704157

[51] Int. Cl.² ............................................. B21B 31/08
[52] U.S. Cl. ................... 29/148.4 D; 29/127; 29/121.4
[58] Field of Search ............... 29/127, 121.4, 148.4 D, 29/121.6; 19/95, 112

[56] References Cited

U.S. PATENT DOCUMENTS

| 508,064 | 11/1893 | Sykes | 19/112 |
|---|---|---|---|
| 542,605 | 7/1895 | Clay et al. | 19/97 |
| 1,346,637 | 7/1920 | Coulston | 19/97 |
| 1,530,285 | 3/1925 | Allen | 19/97 |
| 3,718,959 | 3/1973 | Sailas | 29/121.6 |
| 3,831,243 | 8/1974 | Conrad | 29/148.4 D |
| 3,968,542 | 7/1976 | Hollingsworth | 19/97 |

Primary Examiner—Wayne L. Shedd
Attorney, Agent, or Firm—Kenyon & Kenyon

[57] ABSTRACT

In a grooved drum with a working drum surface of metal consisting of a cylindrical inner drum on which at least one ribbon is helically wound, turn by turn, the radially outer boundary of which forms the working drum surface, the ribbon also forming axially extending circumferential grooves, adjacent turns of the ribbon are connected to each other in a form locking manner on their sides facing each other in the axial direction causing the adjoining turns to be immovably fixed relative to each other so that in the event of a break in the ribbon the turns will not give in to the circumferential tension force generated during winding and burst open.

4 Claims, 5 Drawing Figures

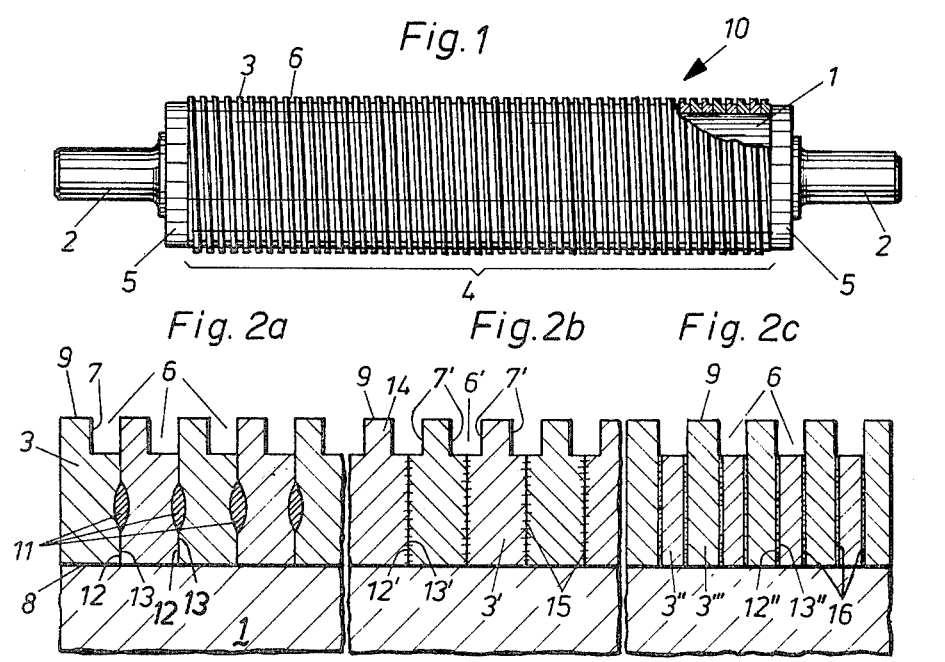
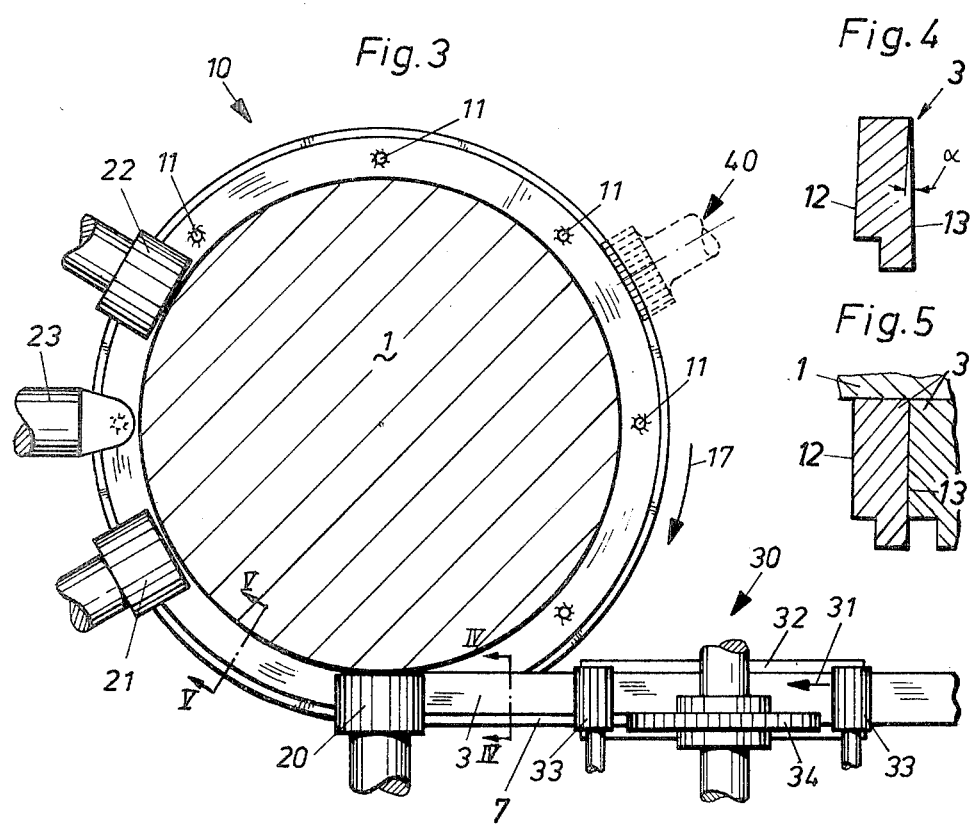

METHOD OF MAKING A HELICALLY GROOVED ROLLER

BACKGROUND OF THE INVENTION

This invention relates to processing of webs in general and more particularly to a grooved drum, preferably for dehydrating paper, cardboard and similar webs.

Grooved drums with a working drum surface of metal, particularly corrosion resistant steel, consisting of a cylindrical inner drum, on which at least one ribbon is helically wound, turn by turn, which forms, with a radially outer boundary, the working drum surface and forms circumferential grooves axially between these boundaries have been known for a long time, for instance, from the German Patent No. 273 304. The winding of ribbons on an inner drum has also been previously used for making elastic drums with a covering of plastic (German Patent No. 1 038 518). The ribbons have, on the sides facing each other in axial direction, mutually engaging profiles and may be cemented to the inner drum. The application of profiles which engage with each other in succeeding turns is also known, for metal ribbons, specifically through the German Offenlegungsschrift No. 25 45 145. In this embodiment, the ribbon consists of profiled material about 10 to 12 mm high and 2 to 3 mm thick, into the lateral surface of which a longitudinal slot is rolled, which is pressed through on the opposite side as a longitudinal rib; the longitudinal ribs are placed in the longitudinal slots of the adjacent turn. During the winding, the ribbon is under considerable pretension and is pressed on in the axial direction by a roller. The forces resulting from the pretension and the axial pressing force are so large that a plastic deformation of the outer zone of the ribbon ensues, so that the latter assumes a curvature corresponding to the curvature of the circumference of the inner drum.

The profiles of the metal ribbons in the known designs of wound grooved drums are lengthwise. They can therefore hold the succeeding turns against each other in the radial direction, but do not counteract shifting of the turns in the circumferential direction.

If now the ribbon breaks, be it in operation or during the winding, it slips, since the elastic tension force caused by the pretension during the winding is released and the turns are not blocked in the circumferential direction. The drum therefore snaps open, whereby it becomes loose and the drum is made unusable.

SUMMARY OF THE INVENTION

It is an object of the present invention to develop a drum of the type mentioned at the outset in such a manner that snapping open in the event of a break of the ribbon is avoided.

To solve this problem, adjoining turns are connected to each other in a form-locking manner on their sides facing each other in the axial direction.

It is achieved thereby that the adjoining turns are immovably fixed relative to each other and cannot give in to the circumferential tension force and burst open, in the event that the ribbon breaks. In addition, the drum is particularly strong since the winding forming the working drum surface forms a practically compact body.

It is no longer necessary to profile the ribbons on the lateral surfaces to obtain engagement since a form locking connection of the ribbons on the sides facing each other prevents mutual mobility in all directions.

In a first embodiment of interest of the present invention, the turns can be welded together and in particular, spot welded at intervals.

This welding is performed when the ribbon is wound and guarantees maximum strength of the mutual joining of the turns.

From the German Offenlegungsschrift No. 1 461 159 it is known to make a drum with surface openings uniformly distributed over the circumference by lining up rings or by winding sheet metal strips. The individual layers are either flat and lie directly on top of each other or are embossed in their plane, so that the openings result from the interaction of the embossings. The individual laminations can be secured in their position in this design by placing welding lines on the circumference of the drum, which join the laminations together. In a grooved drum, however, such a process cannot be realized since welding lines at the circumference interrupt the grooves.

In other embodiments that could be considered, the turns can also be soldered or cemented to each other.

The invention also covers a particularly economical method for manufacturing the grooved drum described above, which is characterized by the feature that during the winding a profile producing the circumferential slots is applied to the ribbon in the course of the winding.

Thus, ordinary rolled material with a simple cross section can be used for making the grooved drum, to which the necessary profile is imparted in the course of the winding. The device which makes the profile can be mounted together with the winding device and the welding device on a support and can be moved along the drum when winding. As the cross sections to be removed are not very large, an appropriately designed milling head can perform the profiling without difficulty with a feed velocity corresponding to the winding velocity.

In one embodiment the profiling is arranged at the ribbon to be wound before the ribbon runs up on the inner drum.

A suitable support which guides the ribbon passing through during the attack of the profiling tool is then provided for the ribbon.

However, it is also possible to apply the profiling at the just wound turn in the area already connected to the preceding turn in a form-locking manner.

This saves a separate support device since the ribbon is already joined and secured to the existing winding at the point of attack of the profiling tool, so that chattering during the milling and similar annoyances cannot occur.

It is understood, however, that one can begin from the start with a profiled ribbon, i.e., to which the profiling resulting in the circumferential slot is not applied as late as in the course of the winding.

The invention also covers the case where the starting profile, immediately prior to the winding is, a normal rectangular profile or that its two sides which are opposite in the wound condition are parallel to each other. It should be noted, however, that with a profile which is originally rectangular or in any case has parallel side surfaces, a deformation of the cross section into a slightly trapezoidal shape occurs because, after the winding, the profile is elongated in the outer zones and is compressed correspondingly in the inner zones. In the outer zone, the material is stretched and, as the volume remains constant, this can only be accompanied by a thinning in the direction of the axis of the drum. Although in a normal drum diameter of 400 to 800 mm and with a radial height of the profile of 10 to 12 mm, this difference of the thickness in the axial direction inside and outside due to the winding is only a few hundredths of a millimeter, this difference adds up to a considerable amount due to the multiplicity of the turns in the axial direction. If the turns rest side by side against each other, a distinctly skewed position of the profile already manifests itself after a short winding distance. In embodiments, in which the turns are cemented or soldered together at the lateral surfaces, the gap between the individual turns can be filled in this manner. Also in welding, the upright position of the ribbon can be maintained by suitably guiding it, if the requirements are not too strict; however, small gaps are then produced between adjoining turns on the outside.

However, if stringent requirements must be met for a compact, coherent and accordingly strong drum surface, then a preprofiled ribbon of substantially trapezoidal cross section can be wound, according to one important embodiment of the invention; the base of the trapezoid is then placed toward the outside during the winding and the angle of the trapezoid is designed so that, after the winding, a rectangular cross section is obtained due to the stretching of the outer zone.

By choosing an already trapezoidally pre-formed starting profile, the deformation occurring during the winding is anticipated. The term "rectangular cross section" is understood to mean that, after the winding, the lateral surfaces of the ribbon which are opposite each other in the axial direction are to be parallel to each other. The magnitude of the trapezoid angle can be calculated in advance in each individual case from the dimensions of the drum and the ribbon. In a drum made with such a ribbon, the lateral surfaces of adjacent turns rest against each other exactly over their entire radial extent, so that no gaps are produced and the best prerequisites for the form-locking joint are provided.

BRIEF DESCRIPTION OF THE DRAWINGS

FIG. 1 is a plan view of the drum according to the present invention.

FIGS. 2a, b, and c show partial longitudinal sections from the surface region of the drum with different profile cross sections of the ribbons.

FIG. 3 is a cross section through a drum in the process of being fabricated at the height of the winding and welding device.

FIGS. 4 and 5 show the ribbon cross sections at the point indicated by the lines IV—IV and V—V, respectively.

DETAILED DESCRIPTION OF THE INVENTION

The drum 10 in FIG. 1 comprises a cylindrical inner drum 1 of any desired design with journals 2 at the ends. Onto the inner drum 1 are helically wound one or more ribbons 3, which cover the surface of the inner drum. The winding 4 is held at its ends by end discs 5 which are bolted to the inner drum 1 or are otherwise secured thereon. The ribbon 3 forms helically circumferential grooves 6 at the surface of the winding 4.

Drums of this type are used, for instance, as dehydrating cylinders in the paper industry.

The details of the design of the drum 10 at the surface are shown in FIGS. 2a, b, and c.

In FIG. 2a, the base of ribbon 3 has a substantially rectangular cross section and is wound on edge around the cylinder 1, so that the longer sides extend substantially in radial planes perpendicular to the axis of the inner drum 1. With one shorter side 8, the ribbon 3 sits on the outer circumference of the inner drum 1. On the opposite, i.e., radially outer shorter side, a small rectangle 7 is taken out of the profile of the ribbon 3 on one edge. This can be done by suitable profile rolling or by milling. Together with the adjoining turn of the ribbon 3, the rectangle 7 makes a rectangular groove 6. The area 9, left standing beside the recessed rectangle 7, of the outer smaller side of the cross section of the ribbon 3 forms the outer boundary of the latter, and all these areas 9 of each turn of the ribbon 9 together make up the working drum circumference.

The individual turns of the ribbon 3 are connected by spots weld 11 on the sides 12 and 13 which face each other, rest against each other and extend substantially in a radial plane perpendicular to the axis. In FIG. 2b, a ribbon 3' is shown which has two opposite, smaller rectangular recesses 7' on the outside, each of which is opposite the corresponding recess 7' of the adjacent turn of the ribbon 3', so that the two recesses 7' together form the groove 6.

The radially outer boundary 9 of the rib 14 left standing between the grooves 6 again makes up the working drum circumference. The cross section of the ribbon 3' is symmetrical, which can have advantages when winding on edge, as the profile does not have the tendency to get warped in the direction of the axis or to tilt somewhat, which can be the case with the profile of the ribbon 3, depending on the ratio of the cross section of the groove 6 to the total cross section of the ribbon 3.

On the sides 12' and 13' facing each other in the axial direction, the adjacent turns of the ribbon 3' are joined together by a solder joint 15.

In FIG. 2c, two ribbons 3" and 3"' are wound on the inner drum 1 as a double thread. The ribbons 3" and 3"' have an unprofiled rectangular cross section, but the ribbon 3"' has a somewhat smaller dimension in the radial direction, so that the groove 6 is formed on the outside between the adjacent turns of the ribbon 3". The width of the groove 6 is therefore determined by the thickness of the ribbon 3"' and the depth of the groove 6 by the difference of the radial dimensions of the ribbons 3" and 3"'. The working drum circumference consists of the outer boundaries 9 of the ribbon with the larger cross section.

On the sides 12" and 13" facing each other, the ribbons 3" and 3"' are joined together by cement 16.

The spot welds 11, the solder joints 15 and the cemented joints 16 make form-locking connections which hold the adjacent turns of the winding 4 immovably to each other.

In FIG. 3, the manufacture of the winding is shown schematically. The inner drum 1 is set in rotation in a lathe or a similar device in the direction of the arrow 17 and the ribbon 3 is wound in the manner that can be seen in FIG. 3. In order to obtain tight packing in the axial direction and good contact of the lateral surfaces of the individual turns opposite each other in axial direction, pressure rolls 20, 21 and 22 are provided. The pressure roll 20 is disposed in the vicinity of the entry point of the ribbon 3 onto the inner drum 1, while the pressure rolls 21 and 22 are mounted on both sides of a welding electrode 23 arranged following in the direction of rotation 17. The electrode 23 makes spot welds at regular intervals of, for instance, 100 mm for a normal drum diameter of 300 to 800 mm. which joins the turn of ribbon 3 just to be wound to the previous, already wound turn. When being wound edgewise, the ribbon 3 is deformed, which presents no difficulties as it is held under a strong tension force and is guided by the pressure rolls 20, 21 and 22. The dimensions of the ribbon 3 depend on the desired dimensions of the circumferential groove 6 and the ribs remaining in between. The ribbon may, for instance, have a height of 10 to 12 mm and a thickness of 2 to 4 mm. A preferred material is corrosion resistant steel; however, any other metal may also be used.

FIG. 3 also shows how a rectangular cutout corresponding to the cutout 7 of the ribbon 3 of the left half of FIG. 2 can be made in an economical manner. One starts with a rolled profile which runs into a profiling or milling station 30 in the direction of the arrow 31. The milling station comprises, for instance, a guide bar 32 for the ribbon and guide rolls 33 pressing the ribbon against the guide bar 32, as well as a side milling cutter 34 which makes a rectangular cutout 7 in the ribbon as it passes by, so that the profile of the ribbon 3 is generated. In this embodiment the machining station 30 immediately precedes the entry point of the ribbon 3 onto the inner drum 1.

It is also possible, however, to provide a machining station 40 immediately at the grooved drum 10 and specifically in the region where the turn would last is already connected to the preceding turn of the ribbon 3 by the spot welds 11. The last turn is thereby held immovable and can be machined by the milling cutter 41 at the machining station 40 so as to generate the rectangular recess 7. A change in the dimensions of the groove width and the groove depth with the same starting material can be achieved merely by readjusting the tool 34 or 41.

As can be seen from FIG. 4, the ribbon in the illustrated embodiment, before it is wound up and before the small rectangle 7 of FIG. 2a is taken out of it, has a slightly trapezoidal shape, i.e., the lateral surfaces 12 and 13 of the ribbon 3 facing each other in the axial direction form an angle α with each other; they diverge radially outward. During winding, this trapezoidal shape, which is shown exaggerated in FIG. 4, is cancelled by the deformation, so that in the wound condition a cross section of the ribbon 3 with parallel lateral surfaces 12 and 13 according to FIG. 5 is produced. The lateral surfaces 12 and 13 of adjacent turns rest against each other in this manner with their full area without having to tilt the ribbon 3, i.e., bringing it from its correct position which extends in a position substantially perpendicular to the drum axis. Assuming purely elastic deformation, the magnitude of the angle α can be calculated for all practical purposes exactly, and, assuming elastic-plastic deformation, with sufficient accuracy, from the dimensions of the ribbon 3 and the drum 1.

What is claimed is:
1. A method of constructing a grooved drum comprising:
   (a) winding a ribbon, which is pre-profiled to have a substantially trapezoidal cross section including a base, two sloping sides extending therefrom and an outside surface opposite said base and containing a rectangular cutout on a cylindrical inner drum;
   (b) stretching said ribbon during said winding because of the outside of said ribbon having a larger circumference than the inside;
   (c) selecting the dimensions of said trapezoid so that, after winding, said stretching will cause a rectangular cross section to be produced; and
   (d) connecting the sides of adjacent turns of the ribbons facing each other in the axial direction, to each other, in a form locking manner whereby the outside surface of said ribbon, after being wound, because of said cutout, will form a working surface with axially spaced circumferential grooves.

2. The method according to claim 1 and further including applying a profile resulting in the circumferential grooves to the ribbon in the course of winding, when the ribbon is being wound.

3. The method according to claim 2 wherein said profile is applied to the ribbon being wound before the ribbon runs onto the inner drum.

4. The method according to claim 1 wherein profile is applied to the turn just wound in the region already connected in a form locking manner to the preceding turn.

* * * * *